(12) United States Patent
Harris

(10) Patent No.: US 10,473,041 B1
(45) Date of Patent: Nov. 12, 2019

(54) COLD START OF INTERNAL COMBUSTION ENGINE

(71) Applicant: Northwest ULD, Inc., McMinnville, OR (US)

(72) Inventor: Chris B. Harris, Amity, OR (US)

(73) Assignee: Northwest Uld, Inc., McMinnville, OR (US)

( * ) Notice: Subject to any disclaimer, the term of this patent is extended or adjusted under 35 U.S.C. 154(b) by 0 days.

(21) Appl. No.: 15/584,586

(22) Filed: May 2, 2017

Related U.S. Application Data

(60) Provisional application No. 62/330,650, filed on May 2, 2016.

(51) Int. Cl.
| | |
|---|---|
| *F02D 19/06* | (2006.01) |
| *F02B 61/04* | (2006.01) |
| *F02B 75/16* | (2006.01) |
| *B64C 39/02* | (2006.01) |
| *B64D 27/04* | (2006.01) |

(52) U.S. Cl.
CPC ........ *F02D 19/0613* (2013.01); *B64C 39/024* (2013.01); *F02B 61/04* (2013.01);
(Continued)

(58) Field of Classification Search
CPC ............. F02D 19/0613; F02D 19/0649; F02D 19/0678; F02D 19/0684; B64C 39/024;
(Continued)

(56) References Cited

U.S. PATENT DOCUMENTS

| | | | | |
|---|---|---|---|---|
| 2009/0292442 | A1* | 11/2009 | Leone | F02B 17/005 |
| | | | | 701/103 |
| 2011/0214644 | A1* | 9/2011 | Barta | F02M 37/04 |
| | | | | 123/512 |

(Continued)

FOREIGN PATENT DOCUMENTS

| | | |
|---|---|---|
| WO | 2013103542 | 7/2013 |

OTHER PUBLICATIONS

Wikipedia contributors. 'Starting fluid'. In Wikipedia, The Free Encyclopedia [online], [retrieved on May 22, 2017]. Retrieved from the Internet: <URL: https://en.wikipedia.org/w/index.php?title=Starting_fluid&oldid=781778569>.

*Primary Examiner* — Joseph J Dallo
*Assistant Examiner* — Kurt Philip Liethen
(74) *Attorney, Agent, or Firm* — Marsh Fischmann & Breyfogle LLP

(57) ABSTRACT

An internal combustion engine has both a primary fuel system and a starting fuel intake assembly. The primary fuel system and the starting fuel intake assembly provide separate flow paths to a common chamber of the internal combustion engine. An external starting fuel source is fluidly connectable with the starting fuel intake assembly of the internal combustion engine, for instance when exposed to a low ambient temperature environment. The internal combustion engine is started while a starting fuel is flowing into a combustion chamber for the internal combustion engine. A primary fuel may also be flowing into the combustion chamber at this time. After the primary fuel is being consistently ignited in the combustion chamber, the flow of starting fuel to the combustion chamber may be terminated and the external starting fuel source may be fluidly disconnected from the starting fuel intake assembly of the internal combustion engine.

20 Claims, 12 Drawing Sheets

(52) U.S. Cl.
CPC .......... *F02B 75/16* (2013.01); *F02D 19/0649* (2013.01); *F02D 19/0678* (2013.01); *B64C 2201/044* (2013.01); *B64D 27/04* (2013.01); *F02D 19/0684* (2013.01)

(58) Field of Classification Search
CPC .... B64C 2201/044; F02B 61/04; F02B 75/16; B64D 27/04
See application file for complete search history.

(56) References Cited

U.S. PATENT DOCUMENTS

| | | | |
|---|---|---|---|
| 2015/0034025 A1* | 2/2015 | Markoski | F01N 3/103 123/2 |
| 2015/0136097 A1* | 5/2015 | Hoshi | F02D 19/0615 123/575 |
| 2016/0025029 A1* | 1/2016 | Kolhouse | F02D 41/062 123/672 |
| 2016/0363058 A1* | 12/2016 | Sarder | F02D 19/0605 |
| 2016/0363099 A1* | 12/2016 | Collie | F02B 63/04 |

\* cited by examiner

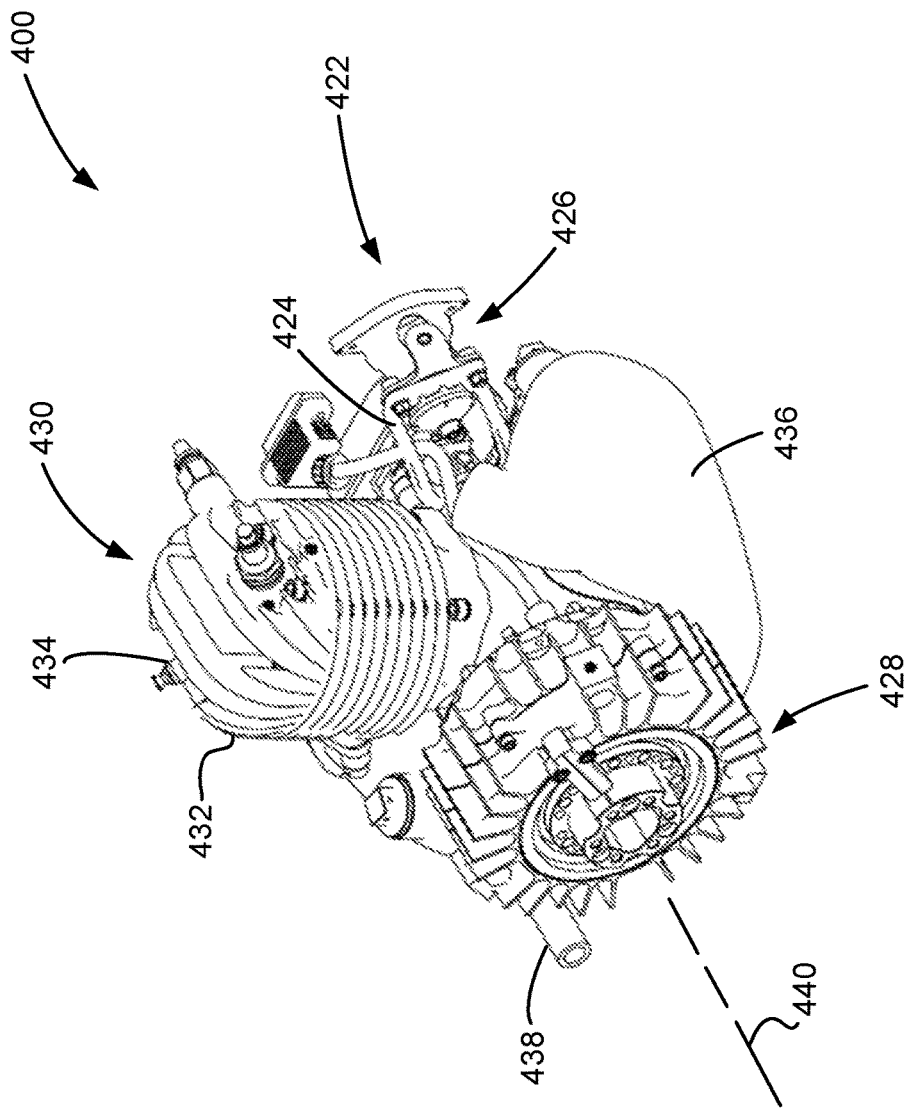

COLD START OF INTERNAL COMBUSTION ENGINE

CROSS-REFERENCE TO RELATED APPLICATIONS

This patent application claims the benefit of co-pending U.S. Provisional Patent Application No. 62/330,650, that was filed on May 2, 2016, and the entire disclosure of which is hereby incorporated by reference.

FIELD

The present invention generally relates to internal combustion engines and, more particularly, to starting internal combustion engines, for instance in low ambient temperature conditions.

BACKGROUND

Internal combustion engines are typically configured to combust fuels appropriate to the application in order to drive a shaft. Generally, internal combustion engines utilize ambient temperatures and the engine heat itself to provide for the adequate vaporization and subsequent combustion of the fuel.

In environments with low ambient temperature, however, the cold-start of the internal combustion engine presents challenges. The ambient air may provide insufficient levels of heat to vaporize the fuel, while the engine itself provides essentially no additional heat until it begins running. Fuel and block pre-heaters for cold-start engines are known in the art, however they suffer from a variety of disadvantages such as requiring direct heating of a large portion of the engine, an external power source, additional weight relative to the components applied to achieve the heating, and may require protracted wait times to achieve ignition and initiation of the combustion cycle.

SUMMARY

The following presents a simplified summary of the innovation in order to provide a basic understanding of some aspects of the innovation. This summary is not an extensive overview of the invention. It is intended to neither identify key or critical elements of the innovation nor delineate the overall scope of the invention. The sole purpose of this summary is to present some concepts of the innovation in a simplified form as a prelude to the more detailed description of embodiments shown in the accompanying figures.

One objective of the present invention is to provide a method and apparatus for heating cold-soaked internal combustion engines which does not require extensive set-up, does not require extensive disassembly, does not require an external power source but provides for the direct heating of the cylinder and substantially reduces engine start time at cold temperatures. In addition, the application of this inventive propane injection system, utilized in place of the various known art methods of built in electric preheaters (or fuel/electric powered external heaters), eliminates the weight, bulk and complexity of built in electric preheaters.

The present invention addresses deficiencies in the prior art by providing a portable, non-powered external source of energy to the engine for the purpose of facilitating the initial ignition of fuel in the cylinder chamber and consequent heating of the engine. In typical applications of aviation and gasoline engines, cold-starting of internal combustion engines is known to the art as being achieved either by raising the engine temperature through the application of an externally powered thermal blanket, coupling device, or electric (or gas) preheater. The present invention eliminates the necessity of the application of the external heat source by briefly introducing an alternate fuel into the combustion chamber. This alternate fuel, in the inventive application being propane for one embodiment, has a significantly lower flashpoint than the applied engine fuel. The flashpoint is the lowest temperature where enough fluid can evaporate to form a combustible concentration of gas. The flashpoint of a typical Jet A aviation grade fuel at 3 bar atmospheric pressure is 114° F. Comparatively, the flashpoint of propane at 3 bar atmospheric pressure is 8.3° F. The insertion of a lower flashpoint fuel into the combustion chamber and subsequent initiation of the ignition process facilitates the propagation of heat throughout the engine even at very low ambient temperatures.

In a preferred embodiment, the inventive solution provides a process for warming the engine and combustion chamber until the temperature of the engine can facilitate complete stoichiometric combustion of the regularly applied fuel type. Propane, or a similarly low flashpoint fuel source, is injected into the port below the throttle body which flows into the injection chamber and then into the combustion chamber through the transfer and boost ports. The air/fuel mixture in the combustion chamber is ignited using the spark plug and the combustion cycle begins. The engine begins to warm naturally until it quickly reaches the temperature where the generally applied fuel (gasoline, ethanol, aviation grade jet fuels and the like) are able to ignite. As the generally applied fuel reaches consistent ignition, the injection system for the propane is closed and the engine runs solely on the applied fuel. The propane feed line is then disconnected from the external port on the engine shroud.

In an alternate embodiment of the present invention, the propane (or alternative low flashpoint fuel) input valve is actuated by the medium of input and output signals regulated by the cylinder head temperature sensor and the engine control unit.

A first aspect of the present invention is embodied by a method of starting an engine. An external fuel line is detachably coupled to an internal combustion engine. A first fuel tank is also fluidly connected with the internal combustion engine and includes a first fuel. The external fuel line is fluidly connectable with a second fuel source having a second fuel that is different from the first fuel. A flow of the second fuel from the second fuel source is directed into the internal combustion engine and the engine is started. At some point in time after the internal combustion engine has started operating, the second fuel source is fluidly isolated from the engine and the engine thereafter continues to operate using the first fuel from the first fuel tank.

A second aspect of the present invention is embodied by an internal combustion engine having a cylinder, a piston that reciprocates within the cylinder during operation of the engine, and a combustion chamber that is collectively defined by at least the cylinder and the reciprocating piston. A primary fuel system and a starting fuel intake assembly are fluidly connectable with a common chamber of the internal combustion engine. The primary fuel system and the starting fuel intake assembly provide separate flow paths to this common chamber.

A number of feature refinements and additional features are separately applicable to each of above-noted first and second aspects of the present invention unless otherwise noted. These feature refinements and additional features may be used individually or in any combination in relation to each of the first and second aspects.

The internal combustion engine may use a single cylinder or may be of a multi-cylinder configuration. Moreover, the internal combustion engine may be of a two-cycle configuration or a four-cycle configuration. One embodiment of the internal combustion engine utilizes fuel injection. In this case, a fuel injector may direct a first fuel (e.g., from a primary fuel tank for the internal combustion engine) into an injection chamber which in turn is in fluid communication with a combustion chamber for the internal combustion engine. The internal combustion engine could also be configured such that the fuel injector introduces a first fuel directly into the combustion chamber. In any case and when an external starting fuel source is fluidly interconnected with the internal combustion engine (e.g., via a starting fuel intake assembly for the engine), a second fuel may be directed into the noted injection chamber or directly into the combustion chamber other than through the fuel injector.

The first and second fuels that may be separately introduced into a common chamber of the internal combustion engine may be of different types and/or may have different flashpoints. One embodiment has the flashpoint of the second fuel (e.g., introduced via a starting fuel intake assembly) being less than a flashpoint of the first fuel (e.g., introduced via a fuel injector). One embodiment has the first fuel being aviation fuel, with the second fuel being propane, butane, or the like.

An external starting fuel source may be detachably coupled with the internal combustion engine, such as through an inlet fitting that is accessible on exterior of the internal combustion engine. Such an inlet fitting may extend through a shrouding of the internal combustion engine and may protrude from an exterior surface of the shrouding so as to be disposed on and accessible on an exterior of the engine. As such, a detachable connection with a starting fuel source conduit having a corresponding fitting (e.g., using a quick connect/disconnect configuration of the type commonly used for hydraulic applications and that do not require the use of any tooling for coupling or decoupling) may be established on an exterior of the engine (e.g., so as to not require removal of any engine components for starting the engine using an alternative fuel).

A flowpath of any appropriate type/configuration extends from the above-noted inlet fitting to a chamber of the internal combustion engine. A starting fuel (e.g., propane) may be directed into this chamber through the inlet fitting. A primary fuel (e.g. aviation fuel) may be simultaneously directed into this same chamber, for instance through a fuel injector. After the internal combustion engine is suitably operating, the flow of starting fuel to the internal combustion engine may be terminated and the external starting fuel source may be disconnected from the internal combustion engine at the noted inlet fitting.

The engine assembly may be used for any appropriate application, including for an aircraft, helicopter or other aerial vehicles. In this regard, the engine assembly may include a propeller assembly that is rotated by operation of the internal combustion engine. Such an engine assembly may include a mounting system for mounting the engine assembly to an airframe or body of an aircraft or aerial vehicle. This mounting system may include a plurality of mounting legs (e.g., three or more that are spaced about an axis that coincides with a rotational axis of the propeller assembly). An upper section of each such mounting leg may be integrally formed with a crankcase housing for the engine assembly. A lower section of each such mounting leg may be in the form of a vibration damping or isolation subassembly, and each such lower section may be of any appropriate configuration to provide the desired/required support and/or vibration damping/isolation effects, including where the lower section for at least one mounting leg is less stiff than the lower section for at least one other mounting leg. A free end of each mounting leg may be appropriately secured to a mounting ring or base, which in turn may be appropriately secured to an airframe or body of an aircraft or aerial vehicle.

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least generally" or the like in relation to a particular feature encompasses the corresponding characteristic and insubstantial variations thereof. Finally, a reference of a feature in conjunction with the phrase "in one embodiment" does not limit the use of the feature to a single embodiment.

BRIEF DESCRIPTION OF THE FIGURES

FIG. 10a is a perspective view of an embodiment of an engine assembly for an aircraft or aerial vehicle application and that uses the type of mounting system shown in FIG. 9.

FIG. 10b a partially exploded, perspective view of the engine assembly shown in FIG. 10a.

DETAILED DESCRIPTION

Figure 1A:
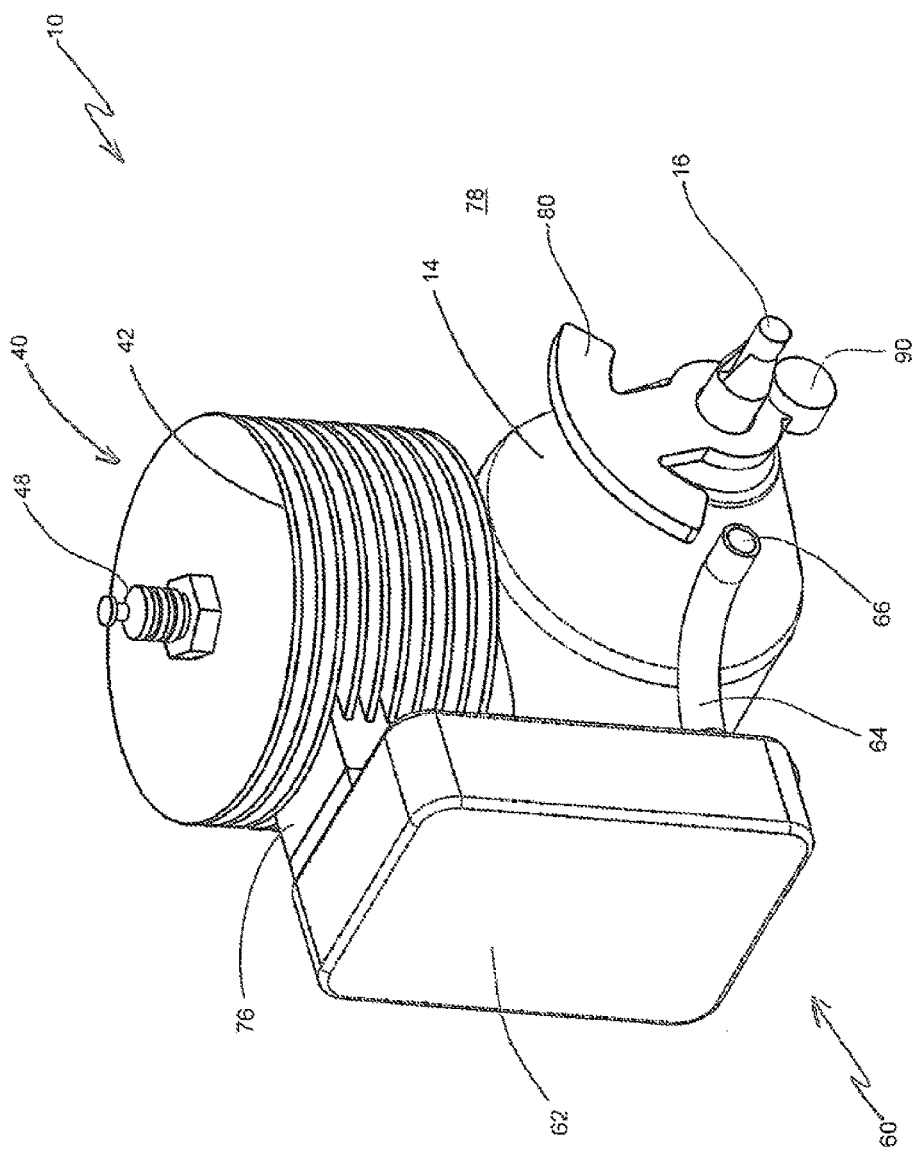
FIG. 1a is a perspective view of one embodiment of an internal combustion engine with an exhaust system reflector, with the exhaust system reflector being in a non-reflecting position for acoustic emissions discharged from the exhaust system.
Figure 1B:
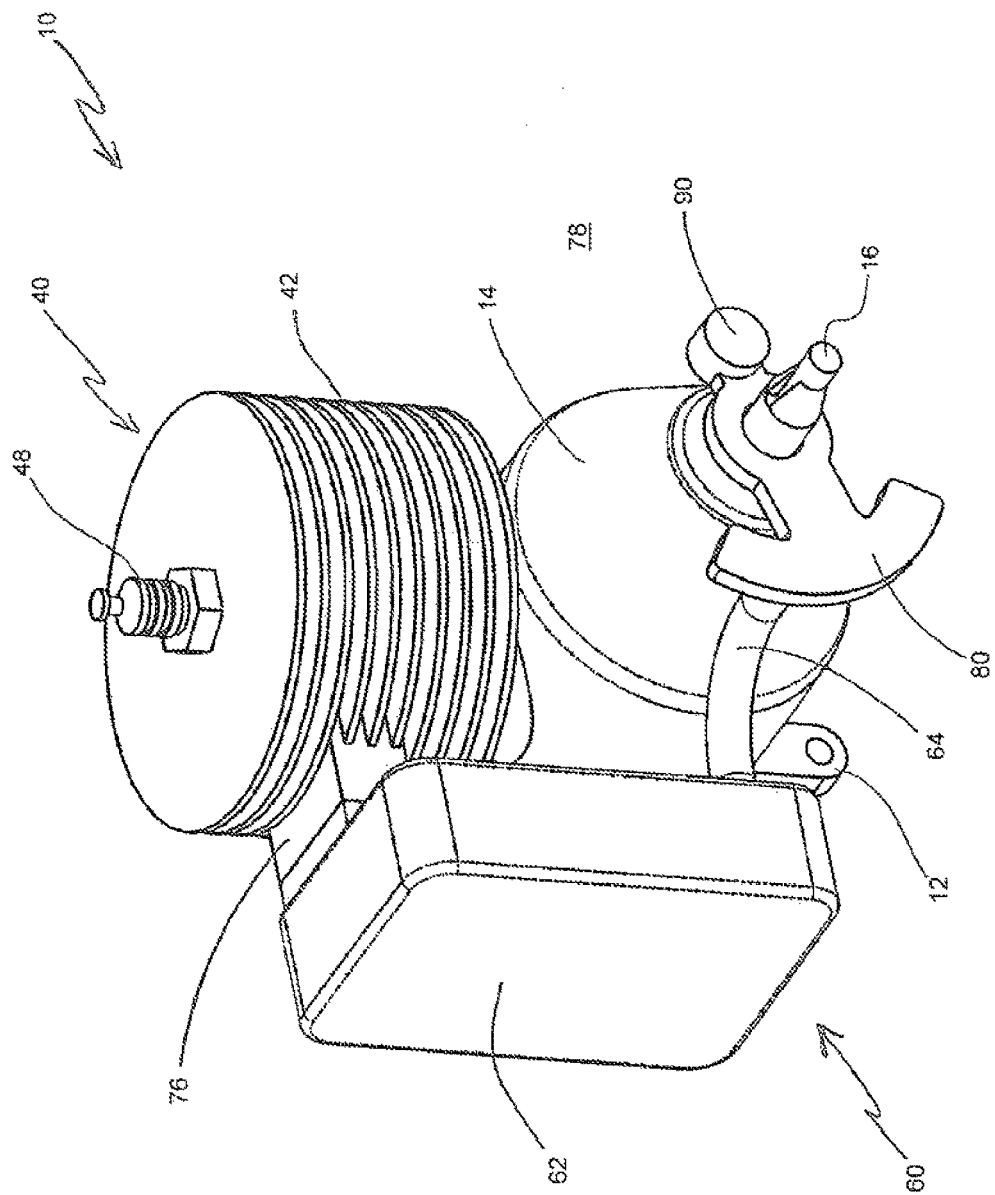
FIG. 1b is another perspective view of the internal combustion engine of FIG. 1a, with the exhaust system reflector being in a reflecting position for acoustic emissions discharged from the exhaust system.

FIGS. 1a and 1b illustrate one embodiment of an internal combustion engine 10. Such an engine may be used in the propulsion of unmanned aerial vehicles, radio-controlled model aircraft, watercraft, and powered hand tools. The engine 10 includes a crankshaft 16, an engine case 14, a cylinder 40 (which may include one or more cooling fins 42 for removing heat generated during operation of the engine 10), one or more spark plugs or other igniters 48, an exhaust system 60, an exhaust system reflector 80 located downstream of the exhaust system 60, and a counterweight 90. The exhaust system reflector 80 and associated counterweight 90 may not be required for all applications. One or more engine mounts 12 may be utilized for securing the engine 10 relative to a vehicle of any appropriate type, such as an unmanned aerial vehicle, or relative to any appropriate supporting structure. Rotation of the crankshaft 16 may rotate a propeller (e.g., propeller 304 for the engine assembly 300—FIGS. 7 and 8), may rotate an axle or propulsor (in the case of a watercraft), or the like.

The exhaust system 60 for the engine 10 includes a muffler 62 that receives a discharge or exhaust/exhaust flow from the cylinder 40 during operation of the engine 10 and via an exhaust header 76 that fluidly interconnects the cylinder 40 and the muffler 62. The muffler 62 may be of any appropriate size, shape, configuration, and/or type. An exhaust conduit 64 (e.g., a tailpipe or stinger) extends from the muffler 62 and includes an open end or exhaust discharge port 66. As such, exhaust from the cylinder 40 flows into/through the header 76, then into/through the muffler 62, and then into/through the exhaust conduit 64 such that the exhaust exits through the open end 66 of the exhaust conduit 64 and into the atmosphere 78.

The exhaust flowing out of the exhaust system 60 through the open end 66 of the exhaust conduit 64 may be characterized as including two primary components—a bulk exhaust gas flow and acoustic emissions (e.g., one or more acoustic waves). The exhaust system reflector 80 is used by the engine 10 to force at least a part of the acoustic emissions (after having exited the exhaust system 60 through the open end 66 of the exhaust conduit 64, or at least after having reached the open end 66 of the exhaust conduit 64 back into the exhaust conduit 64 (via its open end 66) and preferably then back into the muffler 62. This reflection and/or obstruction of at least part of the acoustic emissions should dampen the acoustic emissions (e.g., further lower the acoustic emissions from operation of the engine 10; accommodate additional acoustic wave destructive interference) more than if the acoustic emissions make a single pass through the muffler 62 in proceeding from the cylinder 40 to the exhaust conduit 64. In addition to the foregoing, the reflector 80 should also be sized and timed (relative to the position of the open end 66 of the exhaust conduit 64) to reduce the potential of an unacceptable amount of the bulk exhaust gas flow being redirected or obstructed by the reflector 80, which could generate a back pressure in the muffler 62 and the cylinder 40, which in turn could adversely affect the operational performance of the engine 10. Preferably at most only a very minor amount of the bulk exhaust gas flow is reflected or obstructed by the exhaust system reflector 80 at any time. As such, the reflector 80 may also be referred to as an acoustic emissions valve 80 that is positioned downstream of the exhaust system 60. Such an acoustic emissions valve 80 may be moved into a position (by the crankshaft 16) so as to reflect or obstruct acoustic emissions, but may be moved out of this position (by the crankshaft 16) so as to not obstruct the bulk exhaust gas flow that has exited the exhaust system 60.

The exhaust system reflector 80 may be integrated with the crankshaft 16 in any appropriate manner so that the exhaust system reflector 80 and the crankshaft 16 rotate in unison—the reflector 80 will rotate 360° each time that the crankshaft 16 rotates 360° in the case of an engine with a single cylinder head. The reflector 80 could be separately attached to the crankshaft 16 in any appropriate manner, the reflector 80 could actually be part of the crankshaft 16, or the like. The counterweight 90 may also be incorporated by the crankshaft 16 in any appropriate manner so that the counterweight 90 and the crankshaft 16 also rotate in unison—the counterweight 90 will rotate 360° each time that the crankshaft 16 rotates 360°. The counterweight 90 could be separately attached to the crankshaft 16 in any appropriate manner, the counterweight 90 could actually be part of the crankshaft 16, or the like. In the illustrated embodiment, the counterweight 90 is mounted 180° from the reflector 80 relative to a rotational axis of the crankshaft 16 (e.g., the counterweight 90 and reflector 80 are disposed in opposing relation relative to the crankshaft 16). The counterweight 90 functions to maintain an appropriate rotational balance for the crankshaft 16. Other configurations where rotation of the crankshaft 16 moves the reflector 80 in the manner to be described herein may be utilized by the engine 10.

The reflector 80 is located outside of the exhaust system 60. The exhaust system 60 discharges to the atmosphere 78. As such, the reflector 80 is located within the atmosphere 78. In order to reflect at least part of the acoustic emissions back into the exhaust system 60, but to not reflect any substantial portion of the bulk exhaust gas flow back into the exhaust system 60, the reflector 80 is rotated into and out of alignment with the open end 66 of the exhaust conduit 64 through rotation of the crankshaft 16. "In alignment" in relation to the relative positioning of the reflector 80 and the open end 66 of the exhaust conduit 64 means that at least part the flow out of the open end 66 of the exhaust conduit 64 impacts the reflector 80 in a manner that reflects at least part of this flow back into the exhaust system 60 (where this flow is in the form of acoustic emissions in this instance). "Out of alignment" in relation to the relative positioning of the reflector 80 and the open end 66 of the exhaust conduit 64 means that the flow out of the open end 66 of the exhaust conduit 64 does not impact the reflector 80 in a manner that obstructs flow out of the exhaust system 60 (where this flow is in the form of the bulk exhaust gas flow in this instance). It should be appreciated that in certain instances the reflector 80 will be blocking/reflecting only a portion of the flow exiting the exhaust system 60 (e.g., as the reflector 80 is being rotated into alignment with the open end 66 of the exhaust conduit 84, and where the flow in this instance is in the form of acoustic emissions).

Figure 1C:
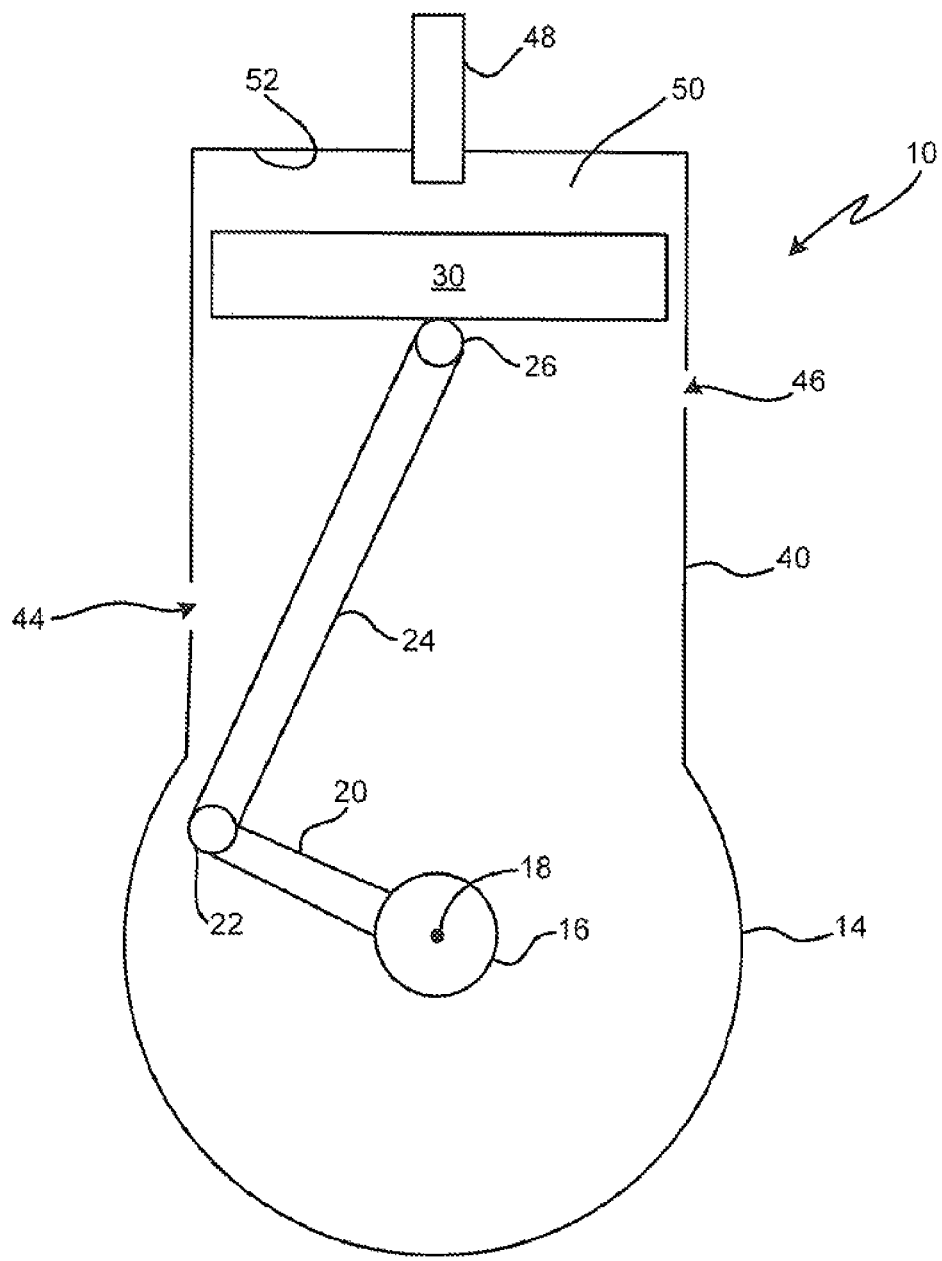
FIG. 1c is a schematic of one configuration of a cylinder for the internal combustion engine of FIG. 1a, along with a corresponding piston.

A schematic of a portion of the internal combustion engine 10 is presented in FIG. 1c. The engine 10 may use one or more cylinders 40, and furthermore may be of a two-cycle configuration. A piston 30 reciprocates within the cylinder 40. In this regard, a connecting rod 20 is appropriately fixed relative to a crankshaft 16 and extends to a pivot 22. A piston rod 24 extends from the pivot 22 to another pivot 26 associated with the piston 30. As such, rotation of the crankshaft 16 about its rotational axis 18 will drive the piston 30 up and down in alternating fashion (in the view shown in FIG. 1c).

The cylinder 40 includes an intake port 44 and an exhaust port 46. One or more valves may be associated with one or more of the ports 44, 46. An injection chamber (e.g., injection chamber 142 discussed below) may provide an air/fuel mixture to the intake port 44. In any case, an air/fuel mixture may be directed into the engine case 14 through the intake port 44 during movement of the piston 30 from a bottom dead center position toward a top dead center position (after the piston 30 passes the intake port 44). This movement of the piston 30 also compresses the air/fuel mixture that is contained within the combustion chamber 50 (located between the piston 30 and a closed end 52 of the cylinder 40, and directed into the chamber 50 through the intake port 44/engine case 14). At some point in time during the movement of the piston 30 toward its top dead center position, the piston 30 will isolate the exhaust port 46 from the combustion chamber 50.

When the piston 30 reaches (or is at least near) its top dead center position, a spark plug or igniter 48 ignites the air/fuel mixture within the combustion chamber 50, which drives the piston 30 from its top dead center position back toward its bottom dead center position. At some point in time during the movement of the piston 30 toward its bottom dead center position, the exhaust port 46 will be exposed to the combustion chamber 50 to allow a flow of exhaust out of the combustion chamber 50, through the exhaust port 46, and into the above-discussed exhaust system 60 (e.g., into/through the exhaust header 76, and then into/through the muffler 62, and then into/through the exhaust conduit 64). Movement of the piston 30 toward its bottom dead center position will at some point in time compress the air/fuel mixture that has previously entered the engine case 14 through the intake port 44.

Figure 2:
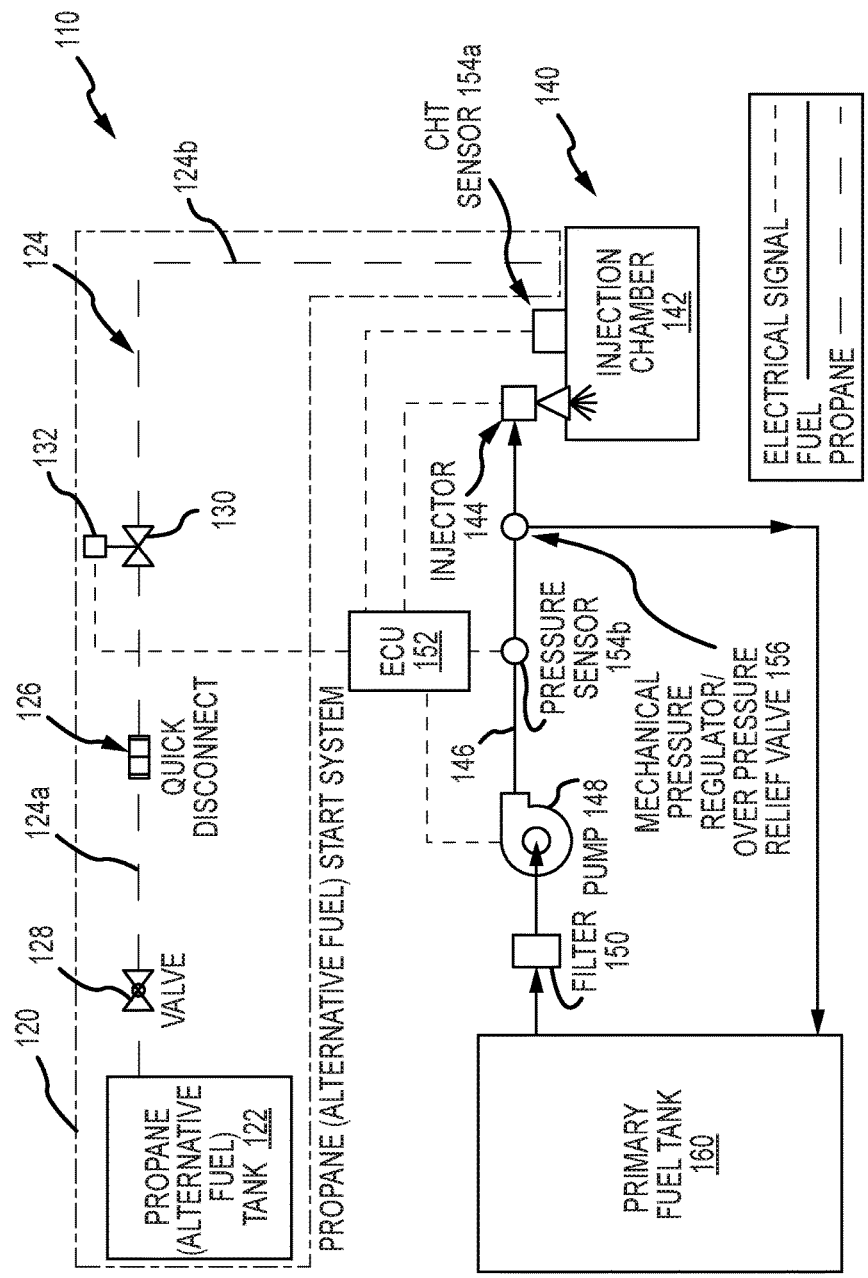
FIG. 2 is a fuel system flow diagram of an engine assembly that includes both a cold start system and an internal combustion engine.

One embodiment of an engine assembly is presented in FIG. 2 and is identified by reference 110. There are two primary components of the engine assembly 110—an internal combustion engine 140 and a separate cold start system 120. The engine 140 may be of any appropriate configuration and may be used for any appropriate application, including in accordance with the engine 10 addressed above. The cold start system 120 is fluidly connected or coupled with the internal combustion engine 140 when attempting to start the engine 140, for instance in a low ambient temperature condition or environment. At some point in time after the engine 140 is operating, the cold start system 120 is fluidly disconnected or decoupled from the engine 140. Thereafter the engine 140 may be used for the corresponding application.

The cold start system 120 includes an external starting fuel source 122 that is fluidly connectable with the engine 140 (e.g. an injection chamber 142) via a starting fuel source conduit 124 of any appropriate type/configuration. In the illustrated embodiment, the starting fuel source conduit 124 includes a first starting fuel source conduit section 124a and a second starting fuel source conduit section 124b that are detachably interconnected via a coupling or connector 126 of any appropriate type/configuration. The first starting fuel source conduit section 124a may include a valve 128 for controlling flow (e.g., shutoff valve 128) to the second starting fuel conduit section 124b. The second starting fuel source conduit section 124b may include a valve 130 for throttling the flow of fuel from the external starting fuel source 122 to the engine 140 (e.g. throttling valve 130). In this regard, a controller 132 may be operatively interconnected with the valve 130, and may be controlled via input from an engine control unit 152 of the engine 140. However, the valve 130 could also be manually controlled to throttle the flow of starting fuel to the internal combustion engine 140. Any appropriate valving may be utilized by the starting fuel source conduit 124, and may be disposed in any appropriate arrangement.

The internal combustion engine 140 includes an injection chamber 142 that is fluidly connectable with the starter fuel source 122 of the cold start system 120 by the starter fuel conduit 124. The injection chamber 142 is also fluidly connected with a fuel tank 160 by a fuel line 146. Fuel may be introduced into the injection chamber 142 by an injector 144. Fuel within the injection chamber 142 may be directed into a combustion chamber for the internal combustion engine 140 (e.g., combustion chamber 50 noted above) for combustion of the fuel in the presence of air.

The engine 140 and the fuel tank 160 are associated with a common structure, such as a vehicle or other body. A fuel filter 150, a fuel pump 148, a pressure sensor 154b, and a pressure regulator or relief valve 156 may be incorporated in the fuel line 146. One or more sensors may be associated with the injection chamber 142, including a cylinder head temperature sensor 154a. The engine 140 further includes what may be characterized as an engine control unit 152. This engine control unit 152 may be operatively interconnected with the fuel pump 148, the injector 144, the cylinder head temperature sensor 154a, and the controller 132 for the throttle valve 130 of the cold start system 120.

The cold start system 120 may be connected from the external starting fuel source 122 (e.g., an external, pressurized supply of propane fuel) to an internal installed fitting assembly by a quick-disconnect connector that is permanently installed at the engine shrouding for the internal combustion engine 140. The flow of starting fuel from the starting fuel source 122 (e.g., propane) to the internal combustion engine 140 may be manually regulated and/or may be regulated by the engine control unit 152 (e.g., throttle valve 130), and also may be manually regulated at the external starting fuel source 122 via a tank coupling assembly and shut-off valve 128. An exemplary embodiment for establishing a flow path between the external starting fuel source 122 and the internal combustion engine 140 is shown in FIGS. 3, 4a, 4b, 5, and 6.

Figure 3:
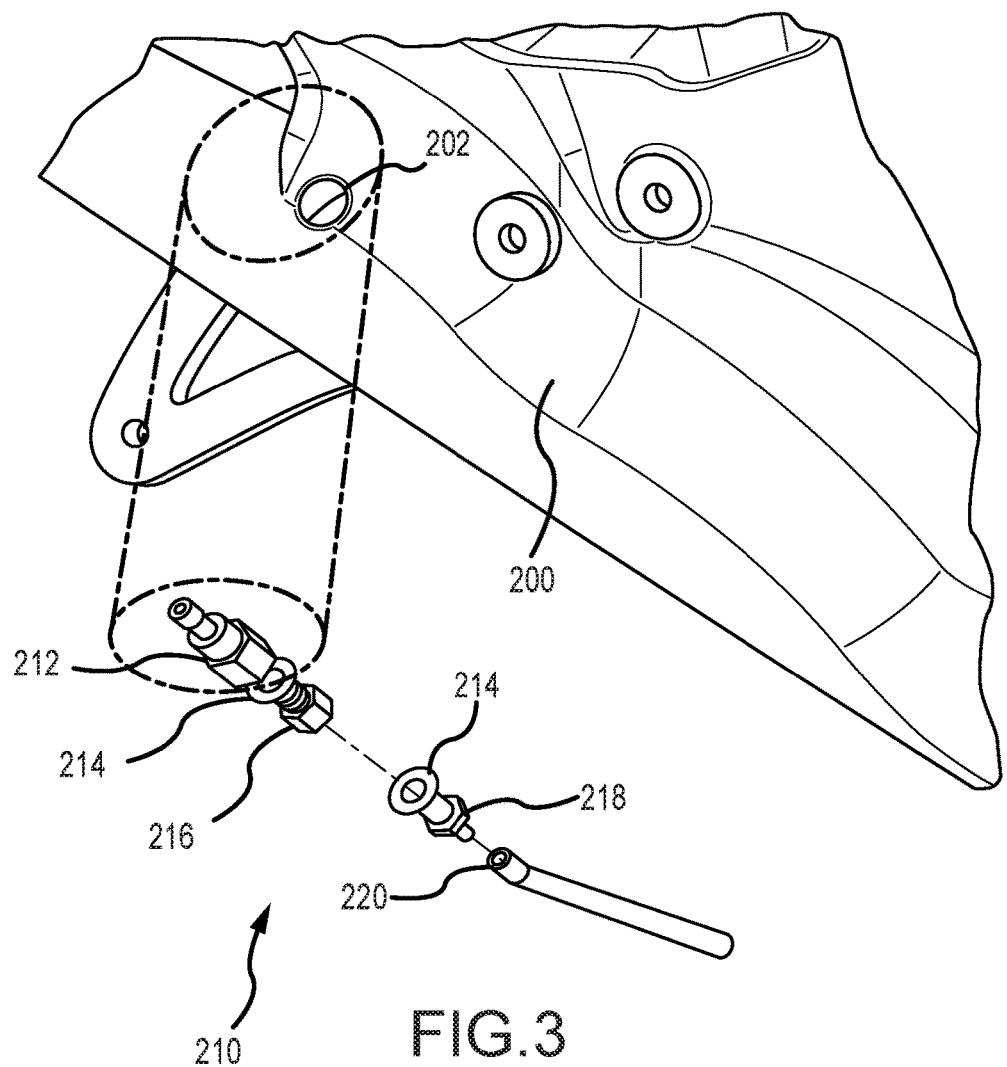
FIG. 3 is a perspective assembly view of one embodiment of a starting fuel intake assembly for an internal combustion engine.

FIG. 3 illustrates a shroud 200 that may be disposed about/over at least a portion of an internal combustion engine 190 (e.g., engine 10; engine 140). A hole 202 extends through the engine shroud 200. An inlet fitting 212 of a starting fuel intake assembly 210 of the internal combustion engine 190 extends/protrudes through this hole 202 and is appropriately retained relative to the engine shroud 200. Generally, the starting fuel intake assembly 210 provides a flowpath to the injection chamber (e.g., injection chamber 142) for the internal combustion engine 190.

Figure 4A:
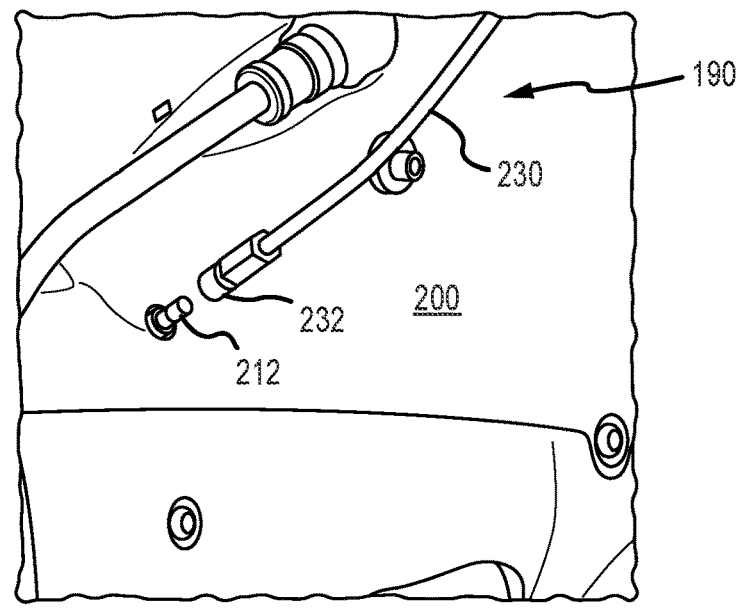
FIG. 4a is a perspective view of both the quick disconnect fitting and tubing from an external starting fuel source, along with a dedicated port and inlet fitting of the starting fuel intake assembly installed on an engine shrouding, all prior to fluidly connecting the tubing from the external starting fuel source with the inlet fitting of the starting fuel intake assembly for the internal combustion engine.
Figure 4B:
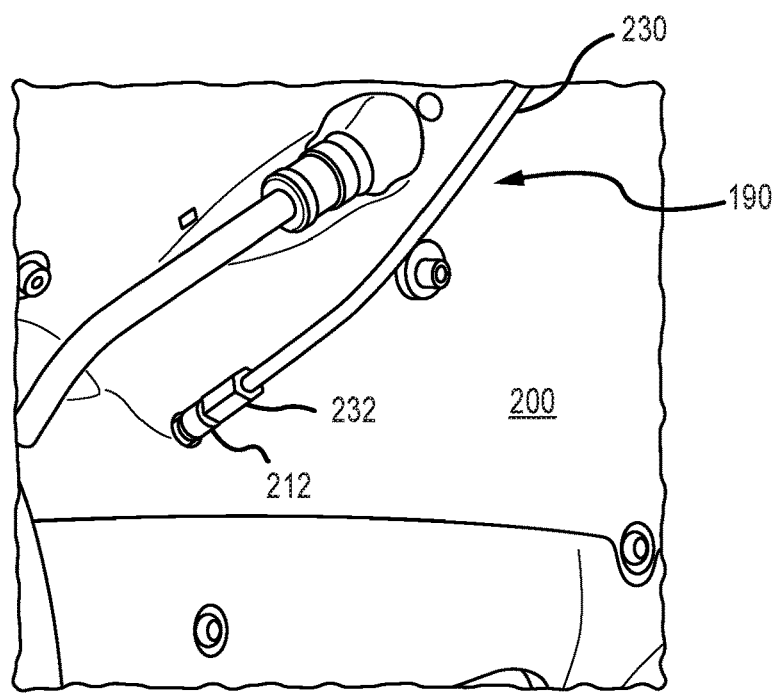
FIG. 4b is a perspective view that illustrates the tubing from the external starting fuel source and the inlet fitting of the starting fuel intake assembly for the internal combustion engine being in a fluidly connected state.

The inlet fitting 212 for the starting fuel intake assembly 210 is accessible on an exterior of the internal combustion engine 190. Now referring to FIGS. 3, 4a, and 4b, a starting fuel source conduit 230 (e.g., starting fuel source conduit 124—FIG. 2) includes a connector 232 on an end thereof that detachably connects with the inlet fitting 212 for the starting fuel intake assembly 210 of the internal combustion engine 190. The starting fuel source conduit 230 extends to the external starting fuel source (e.g., external starting fuel source 122—FIG. 2; only a portion of the starting fuel source conduit 230 in proximity to the starting fuel intake assembly 210 being shown in FIGS. 4a and 4b). FIG. 4a shows the inlet fitting 212 for the starting fuel intake assembly 210 and the starting fuel source conduit 230 being in a disconnected or decoupled state (e.g., such that there is no fluid connection between the external starting fuel source (e.g., starting fuel source 122—FIG. 2) and the internal combustion engine 190). FIG. 4b shows the inlet fitting 212 for the starting fuel intake assembly 210 and the starting fuel source conduit 230 being in a connected or coupled state (e.g., such that there is a fluid connection between the external starting fuel source (e.g., starting fuel source 122—FIG. 2) and the internal combustion engine 190).

The starting fuel intake assembly 210 includes the noted inlet fitting 212, seals 214, an extension fitting 216, a threaded barb fitting 218, and tubing 220. Any appropriate configuration may be used for the starting fuel intake assembly 210. In the illustrated embodiment and as shown in FIGS. 4a and 4b, only the inlet fitting 212 is visible/accessible on an exterior of the engine shroud 200 (e.g., for coupling with the starting fuel source conduit 230, through which starting fuel may flow from the starting fuel source (e.g., external starting fuel source 122—FIG. 2) to the starting fuel intake assembly 210 of the engine 190.

Figure 5:
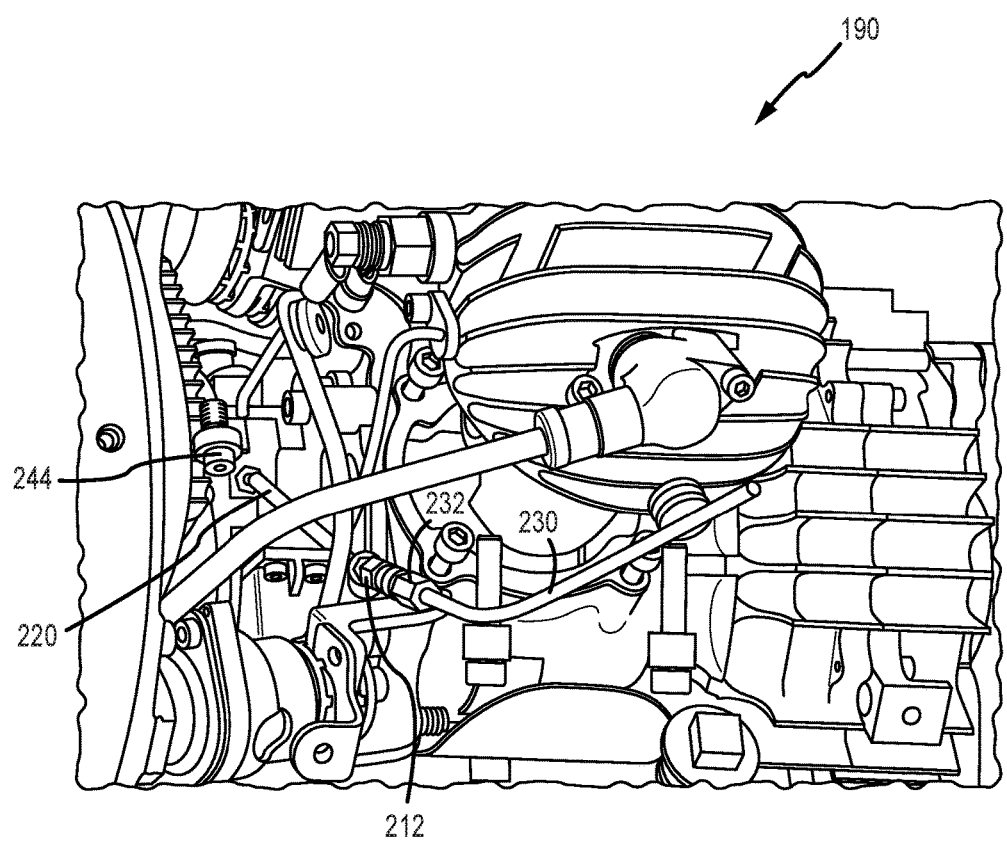
FIG. 5 is a perspective view of a portion of an internal combustion engine with the engine shrouding having been removed to show the tubing and connectors used from the external starting fuel source through the path to a dedicated starting fuel inlet port at a throttle body for the internal combustion engine.
Figure 6:
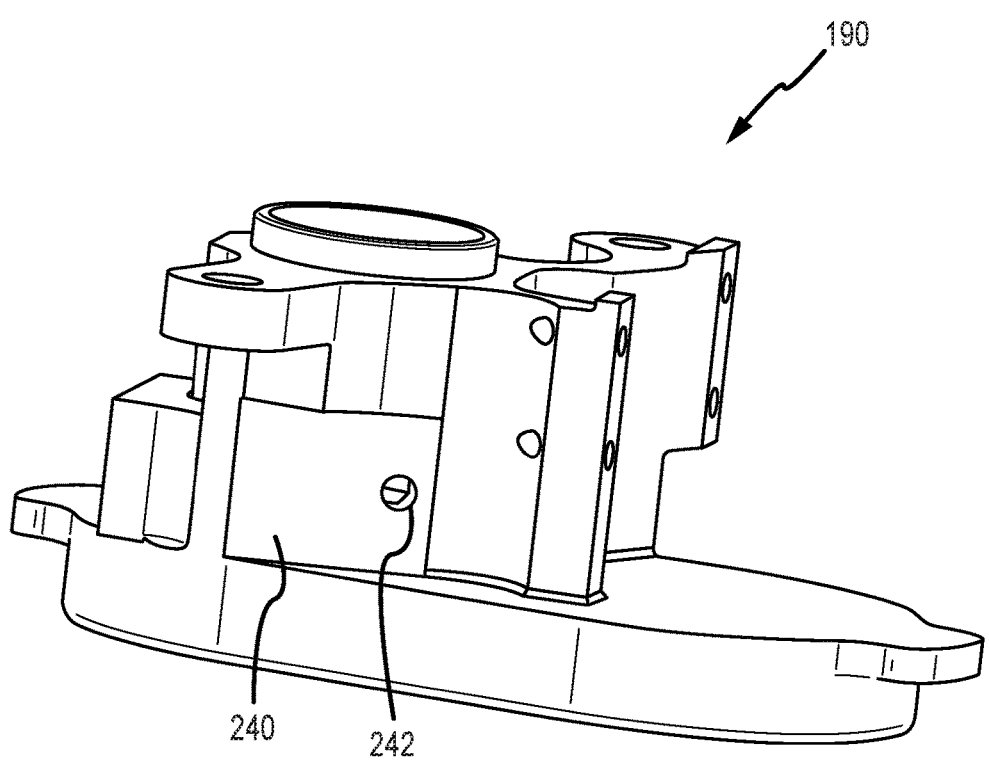
FIG. 6 is a schematic of a representative throttle body for an internal combustion engine having a dedicated starting inlet fuel port.

Referring now to FIGS. 5 and 6, the tubing 220 for the starting fuel intake assembly 210 extends to a fitting 244 on a throttle body 240 of the internal combustion engine 190 and is disposed under the engine shroud 200 (removed for clarity in FIG. 5). This fitting 244 is disposed within a port 242 that leads to the injection chamber (e.g., injection chamber 142—FIG. 2) for the internal combustion engine 190. For clarity, the tubing 220 of the starting fuel intake assembly 210 is shown as being fluidly disconnected from the port 242 on the throttle body 240 in FIG. 5. However, the tubing 220 for the starting fuel intake assembly 210 is intended to remain in a connected state with the fitting 244 on the throttle body 240, including prior to attempting to start the internal combustion engine 190 using a cold start system (e.g., cold start system 120—FIG. 2), during an attempt to start the internal combustion engine using the cold start system (e.g., cold start system 120—FIG. 2), and after the cold start system (e.g., cold start system 120—FIG. 2) has been disconnected from the internal combustion engine 190 (e.g., after the internal combustion engine 190 is an operational state).

Figure 7:
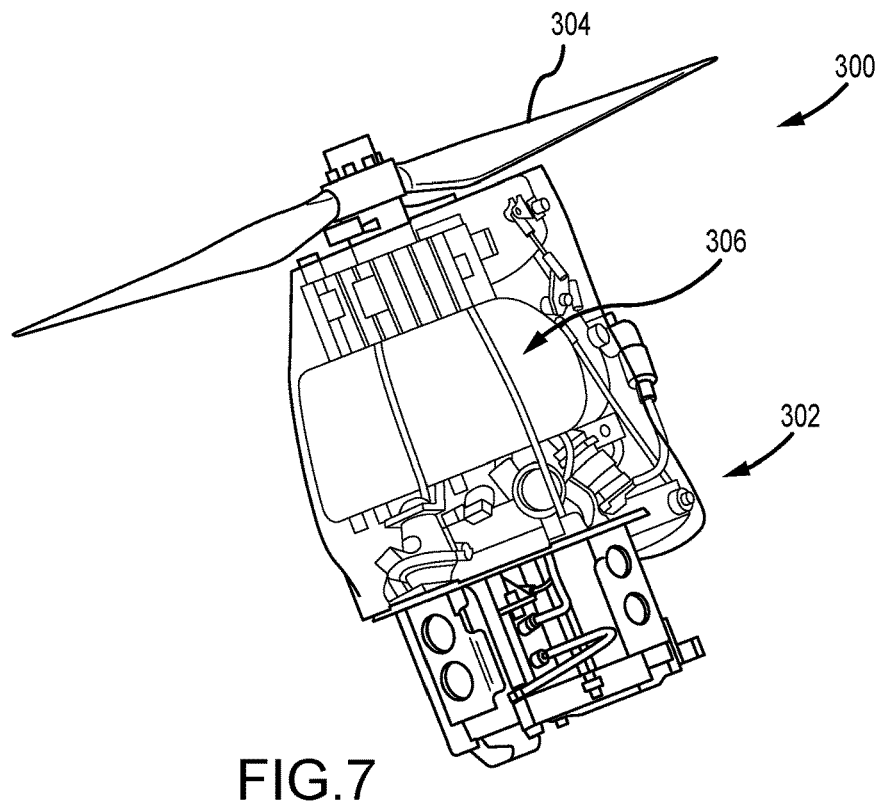
FIG. 7 is a perspective view an embodiment of an engine assembly for an aircraft or aerial vehicle application.
Figure 8:
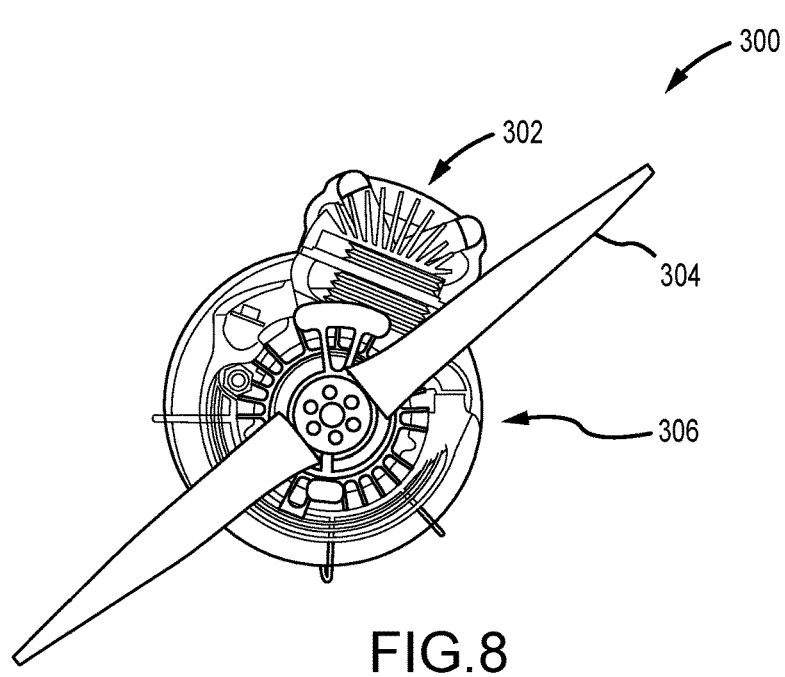
FIG. 8 is another view of the engine assembly shown in FIG. 7, as seen from the propeller assembly.

A representative engine assembly that may incorporate an internal combustion engine (e.g., engine 140 of FIG. 2; engine 190 of FIGS. 3-6) that may be configured for use with a cold start system in accordance with the foregoing (e.g., cold start system 120 of FIG. 2) is illustrated in FIGS. 7 and 8 and is identified by reference numeral 300. The engine assembly 300 may be used by an aerial vehicle or an aircraft of any appropriate type. The engine assembly 300 includes an internal combustion engine 302, a propeller 304 that is rotated by operation of the engine 302, and a muffler 306.

Figure 9:
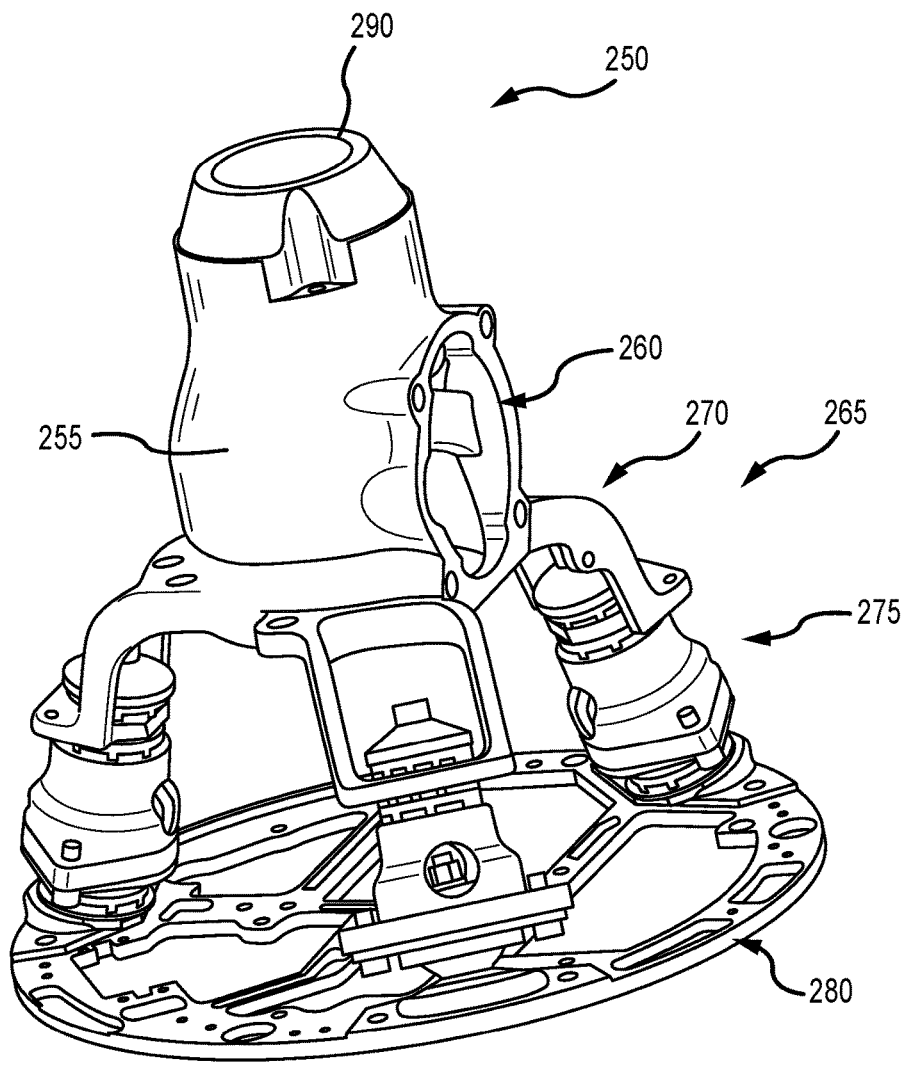
FIG. 9 is a perspective view of a portion of another embodiment of engine assembly, where part of an engine assembly mounting system is integrally formed with a crankcase housing of the engine assembly.

A representative engine assembly is illustrated in FIG. 9 and is identified by reference numeral 250. The engine assembly 250 includes an engine case or crankcase housing 255 (in which a rotatable crankshaft may be disposed). An engine or cylinder block may be mounted to the crankcase housing 255 at a mounting location 255, and a cylinder head may be appropriately mounted to this engine block. The engine block may be of any appropriate configuration (e.g., incorporating one or more cylinders, with each cylinder having a corresponding reciprocating piston disposed therein; where a crankshaft of the engine (disposed with the crankshaft housing 255) reciprocates one or more of these pistons in a timed relation). The cylinder head closes the upper end of the cylinder(s) being utilized by the engine, and may be configured to direct air and/or fuel into each of the cylinders of the engine as well as to allow exhaust gases to be discharged from each of the cylinders of the engine. The cylinder head may also include intake and/or exhaust valves, spark plugs, and the like. In any case, the cylinder head may be characterized as being aligned with the mounting location 260 on the crankcase housing 255, and may be directly or indirectly interconnected with the crankcase housing 255 at this mounting location 260.

The engine assembly 250 further includes an engine assembly mounting system in the form of a plurality of mounting legs 265 that extend between the crankcase housing 255 and a mounting ring 280. The mounting ring 280 may be appropriately secured to an airframe of an aircraft or aerial vehicle (as well as to a bulkhead of a watercraft). Each mounting leg 265 includes an upper section 270 that may be integrally formed with the crankcase housing 255, as well as a lower section 275. The lower section 275 for each mounting leg 265 is in the form of a vibration damping or isolation subassembly, and each such lower section 275 may be of any appropriate configuration to provide the desired/required support and/or vibration damping/isolation effects.

The engine assembly 250 of FIG. 9 may be utilized to integrate the engine assembly 300 of FIGS. 7 and 8 with an airframe of an aircraft or aerial vehicle. In this case, the propeller 304 would be disposed beyond an end 290 of the crankcase housing 255.

Figure 10B:
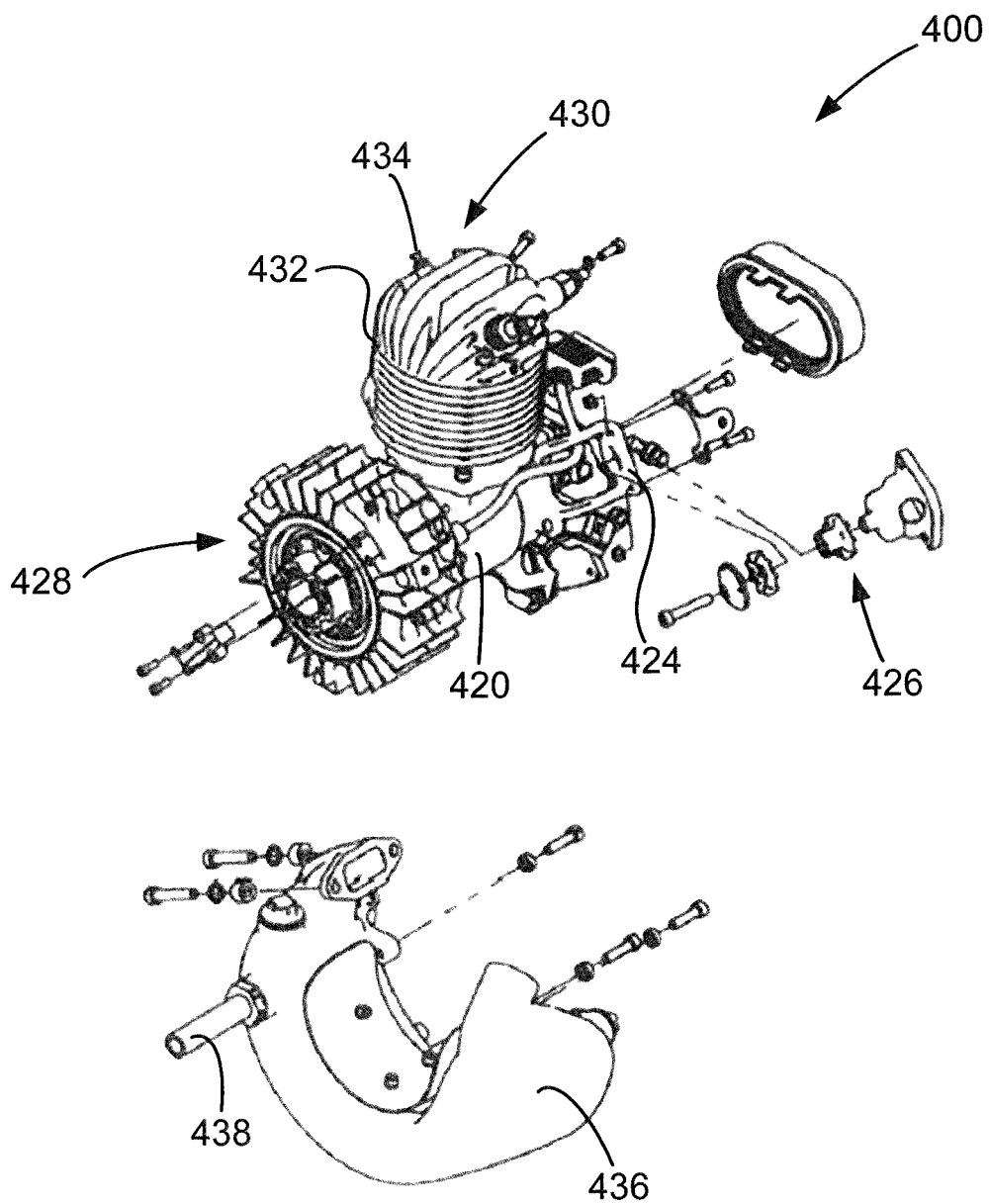

A representative engine assembly is illustrated in FIGS. 10a and 10b and is identified by reference numeral 400. The engine assembly 400 includes an engine case or crankcase housing 420 in which a rotatable crankshaft may be disposed (for instance at least generally in accordance with crankcase housing 255—FIG. 9). A relevant portion of internal combustion engine 430 may be mounted to the crankcase housing 420 at least generally in the above-noted manner. In the illustrated embodiment, the engine 430 includes a single cylinder head 432 having a single combustion chamber. An air/fuel mixture within this combustion chamber is ignited by a pair of spark plugs 434. Exhaust gases may be discharged from this combustion chamber into a muffler 436, and thereafter may be directed into the environment through a stinger 438. The engine assembly 400 shown in FIGS. 10a and 10b is of a push-type configuration—the airframe or body of the associated aircraft/aerial vehicle would be pushed through the air by operation of the engine 430 and rotation of the associated propeller.

The engine assembly 400 further includes an engine assembly mounting system in the form of a plurality of mounting legs 422 (for instance at least generally in accordance with mounting legs 265—FIG. 9) that extend between the crankcase housing 420 and a mounting ring (not shown, but for instance at least generally in accordance with mounting ring 280—FIG. 9). This mounting ring may be appropriately secured to an airframe of an aircraft or aerial vehicle (as well as to a bulkhead of a watercraft or power equipment). Each mounting leg 422 includes an upper section 424 (for instance at least generally in accordance with upper section 270—FIG. 9) that may be integrally formed with the crankcase housing 420, as well as a lower section 426 (for instance at least generally in accordance with lower section 275—FIG. 9).

The engine assembly 400 of FIGS. 10*a* and 10*b* may be mounted to an airframe of an aircraft or aerial vehicle (for instance at least generally in accordance with the discussion of FIG. 9). In this case, the engine assembly 400 includes a propeller assembly 438. Operation of the engine 430 rotates a crankshaft within the crankcase housing 420, which in turn rotates the propeller assembly 438 about a rotational axis 440. The propeller assembly 438 would of course include a propeller of any appropriate type/configuration (for instance propeller 304—FIGS. 7 and 8) and that would be disposed on the free end of the propeller assembly 428 shown in FIGS. 10*a* and 10*b*. As exhaust gases will be discharged out of the stinger 438 in the direction of a plane in which such a propeller will rotate, the engine assembly 400 could utilize the exhaust system reflector 80 used by the engine 10 of FIGS. 1*a* and 1*b*.

The invention has been described in an illustrative manner and it is to be understood that the terminology which has been used is intended to be in the nature of words of description rather than of limitation. Other embodiments and configurations of the invention are possible during the continued development of the current desired engine configuration and alternative applications. It is to be understood that it is within the scope of the invention that the invention may be applied otherwise than as specifically described. The following claims are also in accordance with the invention.

What is claimed is:

1. A method of starting an engine, comprising:
   interconnecting an internal combustion engine with an off-board cold start system, with said engine being in a cold-soaked condition, and prior to initiating operation of said engine, wherein said interconnecting step comprises detachably coupling an external fuel line of said cold start system to said internal combustion engine, wherein a first fuel tank is also fluidly connected with said internal combustion engine and comprises a first fuel, wherein said external fuel line is also fluidly connectable with a second fuel source of said cold start system, and wherein said second fuel source comprises an off-board second fuel tank that in turn comprises a second fuel that is of a different type than said first fuel;
   a first directing step comprising directing a flow of said first fuel from said first fuel tank and to a chamber of said internal combustion engine;
   a second directing step comprising directing a flow of said second fuel from said second fuel tank, through said external line, and then to said chamber of said internal combustion engine, wherein said second directing step is executed after said detachably coupling step;
   starting said internal combustion engine using said second fuel;
   fluidly isolating said second fuel source from said internal combustion engine after said starting step and after said engine has warmed to a first operating temperature, wherein said first directing step is initiated before said fluidly isolating step such that said first fuel and said second fuel are being simultaneously directed into said chamber and while each of said first fuel tank and said second fuel tank are fluidly connected with said chamber; and
   operating said internal combustion engine using only said first fuel from said first fuel tank after said fluidly isolating step.

2. The method of claim 1, wherein said internal combustion engine comprises a fuel injector and a throttle body, wherein said first fuel is directed into said chamber through said fuel injector, wherein said detachably coupling step comprises detachably coupling said external fuel line to said throttle body, and wherein said second fuel is directed into said chamber through said throttle body versus said fuel injector.

3. The method of claim 1, wherein said internal combustion engine comprises shrouding and a fitting that extends through an aperture in said shrouding, wherein a flowpath from said shrouding to said internal combustion engine comprises said fitting, and wherein said detachably connecting step comprising coupling said external fuel line to said fitting externally of said shrouding.

4. The method of claim 1, wherein said second fuel source is pressurized.

5. The method of claim 1, wherein said second directing step comprises opening a valve between said second fuel source and said internal combustion engine.

6. The method of claim 1, wherein said first fuel has a first flashpoint at a reference pressure and said second fuel has a second flashpoint at said reference pressure, and wherein said second flashpoint is less than said first flashpoint.

7. The method of claim 1, wherein said first fuel has a first flashpoint at a reference pressure and said second fuel has a second flashpoint at said reference pressure, and wherein said first flashpoint at said reference pressure is 114° F. and said second flashpoint at said reference pressure is 8.3° F.

8. The method of claim 1, wherein said first fuel has a first flashpoint at a reference pressure and said second fuel has a second flashpoint at said reference pressure, and wherein said second flashpoint is at least 10° C. lower than said first flashpoint.

9. The method of claim 1, wherein said first fuel is an aviation fuel and said second fuel is propane.

10. The method of claim 1, wherein said first fuel is an aviation fuel and said second fuel is butane.

11. The method of claim 1, further comprising:
    disconnecting said external fuel line from said internal combustion engine during said operating step; and
    advancing said internal combustion engine by rotating a propeller using said operating step and using said first fuel for said operating step, wherein said advancing step is executed after said disconnecting step.

12. An engine assembly comprising:
    an internal combustion engine comprising:
       a cylinder;
       a reciprocating piston disposed within said cylinder;
       a combustion chamber defined by said cylinder and said reciprocating piston;
       a primary fuel system fluidly connectable with said combustion chamber and comprising a fuel injector and first fuel tank which in turn comprises a first fuel; and
       a starting fuel intake assembly fluidly connectable with said combustion chamber;
    a cold start system located off board relative to said internal combustion engine, detachably coupled to said starting fuel intake assembly of said internal combustion engine, and comprising a second fuel tank that is off-board relative to said internal combustion engine and that in turn comprises a second fuel that is of different type than said first fuel;
    a first configuration where said internal combustion engine operates with said first fuel and said second fuel being simultaneously directed into a first chamber of said internal combustion engine until said internal combustion engine has warmed to a first operating temperature, wherein said first fuel from said first fuel tank is discharged from said fuel injector and is directed into said first chamber, and wherein said second fuel is transferred from said second fuel tank, to said starting fuel intake assembly, and into said first chamber without proceeding through any fuel injector of said internal combustion engine.

13. The engine assembly of claim 12, wherein said starting fuel intake assembly comprises an inlet fitting accessible on an exterior of said internal combustion engine.

14. The engine assembly of claim 13, further comprising:
engine shrouding, wherein said inlet fitting extends through said engine shrouding and is accessible on exterior of said engine shrouding.

15. The engine assembly of claim 12, wherein said cold start system comprises:
a starting fuel source conduit extending from said second fuel tank to said starting fuel intake assembly of said internal combustion engine.

16. The engine assembly of claim 15, wherein said starting fuel source conduit is detachably coupled with said starting fuel intake assembly on an exterior of said internal combustion engine.

17. The engine assembly of claim 15, wherein said first fuel has a first flashpoint at a reference pressure, wherein said second fuel has a second flashpoint at said reference pressure, and wherein said second flashpoint is less than said first flashpoint.

18. The engine assembly of claim 17, wherein said second flashpoint is at least 10° C. lower than said first flashpoint.

19. The engine assembly of claim 17, wherein said first fuel is an aviation fuel and said second fuel is one of propane or butane.

20. The engine assembly of claim 12, further comprising:
a propeller rotated by operation of said internal combustion engine.

* * * * *